United States Patent
Breault

(10) Patent No.: US 8,137,857 B2
(45) Date of Patent: Mar. 20, 2012

(54) LIQUID ELECTROLYTE FUEL CELL HAVING AN ANODE SUBSTRATE LAYER THICKER THAN THE CATHODE SUBSTRATE LAYER

(75) Inventor: Richard D. Breault, North Kingstown, RI (US)

(73) Assignee: UTC Power Corporation, South Windsor, CT (US)

(*) Notice: Subject to any disclaimer, the term of this patent is extended or adjusted under 35 U.S.C. 154(b) by 125 days.

(21) Appl. No.: 12/311,592

(22) PCT Filed: Oct. 27, 2006

(86) PCT No.: PCT/US2006/042495
§ 371 (c)(1),
(2), (4) Date: Apr. 3, 2009

(87) PCT Pub. No.: WO2008/051230
PCT Pub. Date: May 2, 2008

(65) Prior Publication Data
US 2009/0325033 A1 Dec. 31, 2009

(51) Int. Cl.
*H01M 2/02* (2006.01)

(52) U.S. Cl. .................. 429/483; 429/498; 429/500
(58) Field of Classification Search .......... 429/400, 429/452, 456, 457, 498, 500, 326, 344, 483, 429/492, 520, 521
See application file for complete search history.

(56) References Cited

U.S. PATENT DOCUMENTS

| 2005/0112449 A1* | 5/2005 | Mathias et al. ............... 429/44 |
| 2006/0263659 A1* | 11/2006 | Cho et al. ..................... 429/30 |
| 2009/0053565 A1* | 2/2009 | Iacovelli ....................... 429/15 |

* cited by examiner

*Primary Examiner* — Cynthia H. Kelly
*Assistant Examiner* — Monique Wills
(74) *Attorney, Agent, or Firm* — M. P. Williams

(57) ABSTRACT

A fuel cell (8a) having a matrix (11) for containing phosphoric acid (or other liquid) electrolyte with an anode catalyst (12) on one side and a cathode catalyst (13) on the other side includes an anode substrate (16a) in contact with the anode catalyst and a cathode substrate (17a) in contact with the cathode catalyst, the anode substrate being thicker than the cathode substrate by a ratio of between 1.75 to 1.0 and 3.0 to 1.0. Non-porous, hydrophobic separator plate assemblies (19) provide fuel flow channels (20) and oxidant flow channels (21) as well as demarcating the fuel cells.

9 Claims, 3 Drawing Sheets

US 8,137,857 B2

LIQUID ELECTROLYTE FUEL CELL HAVING AN ANODE SUBSTRATE LAYER THICKER THAN THE CATHODE SUBSTRATE LAYER

TECHNICAL FIELD

A liquid electrolyte fuel cell substrate layer adjacent to the anode catalyst (sometimes referred to as a gas diffusion layer, or GDL), is as much as three or four times thicker than the substrate adjacent to the cathode catalyst, to accommodate the preponderance of acid stored at the anode side of the fuel cell.

BACKGROUND ART

There are two approaches to providing acid to a phosphoric acid fuel cell to replenish acid loss with time due to evaporation into the reactant streams. There are known acid addition approaches where acid in a liquid or vapor form is continuously or periodically added to the cells. These approaches are complicated and expensive. The more preferred approach is the passive approach where sufficient acid to satisfy the life requirements is incorporated into porous components in the cell during the initial assembly of the cell.

There are many different phosphoric acid fuel cell designs. U.S. Pat. No. 4,374,906 shows a cell with ribbed anode and cathode substrates. The '906 cell has a high acid inventory and good electrolyte management characteristics; but is expensive to manufacture due to the high content of expensive carbon fibers and the high volume of carbon-carbon composite material that must be heat treated. U.S. Pat. No. 5,558,955 shows a cell with a ribbed electrolyte reservoir plate as the anode flow field and a nonporous hydrophobic cathode flow field. The '955 cell also has a high acid inventory and good electrolyte management characteristics; but is still expensive to manufacture due to the high volume of carbon-carbon composite material that must be heat treated. Graphite flow fields are not acceptable because they absorb a significant quantity of acid and thus reduce the life of the fuel cell.

WO/2006/071232 discloses a cell which has nonporous anode and cathode flow fields and all of the acid must be stored within the hydrophilic electrode substrates. This cell represents a lower cost design because the carbon fiber content is minimized and the volume of material that must be heat-treated is substantially reduced. Furthermore, porosity need not be a factor, since the flow fields are both non-porous. The '232 cell has poorer electrolyte management characteristics which are the subject hereof.

Proton-conducting liquid electrolytes which may be used as alternatives to phosphoric acid are known. U.S. Pat. No. 5,344,722 discloses an electrolyte which is a mixture of phosphoric acid and a fluorinated compound or a mixture of phosphoric acid and siloxanes. U.S. Publication No. 2006/0027789 discloses a proton-conducting liquid electrolyte where the anion is a fluoroborate or fluoroheteroborate.

Conventional phosphoric acid fuel cell power plants typically comprise stacks 7 of fuel cells 8, as shown in FIG. 1, the temperature of the fuel cells being controlled by a coolant that passes through cooler plates 9 interposed between groups of between five and ten fuel cells. Referring to FIG. 2, each fuel cell 8 comprises an acid retaining matrix 11 having anode catalysts 12 on one side and cathode catalysts 13 on the other side. The catalysts are respectively supported by a porous anode substrate 16 and a porous cathode substrate 17. Porous anode substrate 16 and porous cathode substrate 17 are hydrophilic as is known in the art. The fuel cells (except at the ends or adjacent to cooler plates) share non-porous, hydrophobic separator plate assemblies 19 which include fuel channels 20 adjacent the anode substrate 16 and air (or other oxidant) channels 21 adjacent the cathode substrate 17. The reactant gases in the channels 20, 21 diffuse through respective substrates 16, 17; hence the reference to gas diffusion layers (GDLs). Adjacent a cooler plate 9, the fuel flow channels 20 may be formed in a fuel flow field plate 23 which does not have air flow channels therein; similarly for the cathode side.

The terms "non-porous" and "hydrophobic", as used herein with respect to the separator plates 19, mean that the separator plates 19 are sufficiently non-porous and hydrophobic so that substantially no liquid electrolyte penetrates the separator plates.

As shown in FIG. 2, the traditional phosphoric acid fuel cell has a substrate 16 adjacent the anode catalyst 12 which is of substantially the same thickness as the substrate 17 adjacent the cathode catalyst 13.

The acid that is required for operation of the fuel cell, which must sustain the fuel cell for the life thereof, is ideally sealed within the fuel cell at the time of manufacture. The initial acid fill at manufacture is about 35% to 45% of the void volume in both substrates. The life of a phosphoric acid fuel cell is dependent upon the acid being sufficient so that the matrix and seals in substrates are essentially full during operation and is therefore dependent on retaining acid. If the separator plate assemblies 19 are non-porous and hydrophobic, the phosphoric acid required for the life of the fuel cell must be stored within the porous anode and cathode substrates. Because the substrates 16, 17 represent the principal thermal resistance between the coolers 9, substrates as thin as possible are desired to minimize the temperature rise within the cells between the coolers, and thereby maximize the power density of the fuel cell stack as well as to reduce cost.

Any situation which causes the amount of phosphoric acid to exceed the void volume within the porous substrates 16, 17 results in expulsion of the acid from the cell. That is, the acid will necessarily flow into either or both of the reactant flow field channels 20, 21 and eventually into the manifolds and other reactant gas plumbing. This reduces the amount of acid available, thereby fore-shortening the life of the fuel cell, as well as damaging components which may reduce performance and/or further shorten the life of the cell.

As is known, undiluted phosphoric acid (that is, 100 wt % phosphoric acid) freezes or crystallizes at temperatures as high as 40° C. about (100° F.). Crystallizing or freezing of the electrolyte causes a decay in performance of the fuel cell stack. On the other hand, when diluted to on the order of 70 wt %, the acid will remain a liquid to about –30° C. (about –20° F.). Therefore, when shipping newly manufactured phosphoric acid fuel cells, they are conditioned by diluting the phosphoric acid from close to 100 wt % to about 70 wt % to prevent freezing of the electrolyte during shipment.

SUMMARY

Improvements herein are predicated on discoveries relating to the movement and disposition of phosphoric acid in phosphoric acid fuel cells. Although it has been known that the acid in a phosphoric acid fuel cell is electrochemically pumped from the cathode to the anode due to the influence of the electric field in the matrix on the di-hydrogen phosphate ion, it had been thought that some of the acid which was pumped to the anode would flow back to the cathode due to the influence of capillary forces maintaining a dynamic equilibrium. It was thought the acid fill level of the anode substrate would only be about twice the acid fill level of the cathode substrate.

It has now been learned that the permeability of the anode and cathode catalyst layers is much lower than heretofore believed. This results in the acid fill level of the anode substrate being four to five times greater than the acid fill level of the cathode substrate while the cell is operating. It has also been learned that the imbalance in acid distribution may exist for several hours to several hundred hours after a fuel cell stack is shut down.

In order for reactant gases to diffuse through the substrates to the electrodes, the acid fill level should be not much greater than about 66%. Any further reduction in available pores will result in diffusional losses which cause unacceptable, reduced performance. It has also been found that the electrolyte cannot be conditioned to about 70 wt % acid without the acid fill level in the anode exceeding the void volume of the anode substrate, resulting in acid expulsion into the reactant gas systems. In fact, conventional phosphoric acid fuel cells having an average initial fill of 40% will result in a 119% acid fill of the anode substrate when diluted to shipping concentration. This of course results in acid expulsion and consequential reduced life of the fuel cell system.

To overcome these difficulties in a fuel cell employing a proton-conducting liquid electrolyte, such as phosphoric acid, with non-porous, hydrophobic reactant flow field separator plate assemblies, the thickness of the anode substrate (GDL) is measurably thicker than the cathode substrate (GDL), preferably at least 1.75 times, and more preferably between about 1.75 and about 3 times thicker than the thickness of the cathode substrate (GDL).

As described further hereinafter, as an example, if the anode substrate is twice the thickness of the cathode substrate, and has an acid fill level of 93.6% of the void volume at the shipping concentration, it will have a fill level of about 55% during operation, which is very good from a fuel diffusion and anode performance point of view.

The acid management characteristics of proton-conducting liquid electrolyte fuel cells which utilize non-porous, hydrophobic flow fields are improved while not changing the combined thickness and cost of the anode plus cathode diffusion layers (GDLs). The performance and the life of the fuel cells are improved without compromising the power density or thermal characteristics of the fuel cells.

Other improvements, features and advantages will become more apparent in the light of the following detailed description of exemplary embodiments thereof, as illustrated in the accompanying drawing.

MODE(S) OF IMPLEMENTATION

Figure 1:
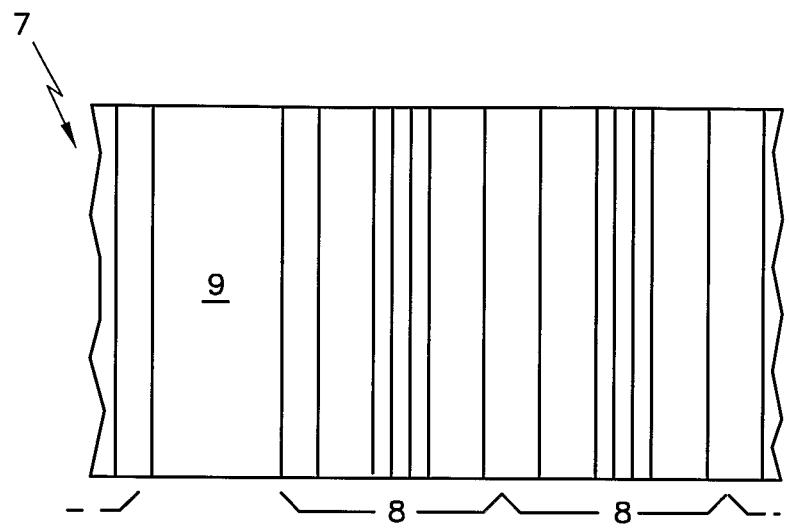
FIG. 1 is a simplified schematic illustration of a phosphoric acid fuel cell stack known to the prior art.
Figure 2:
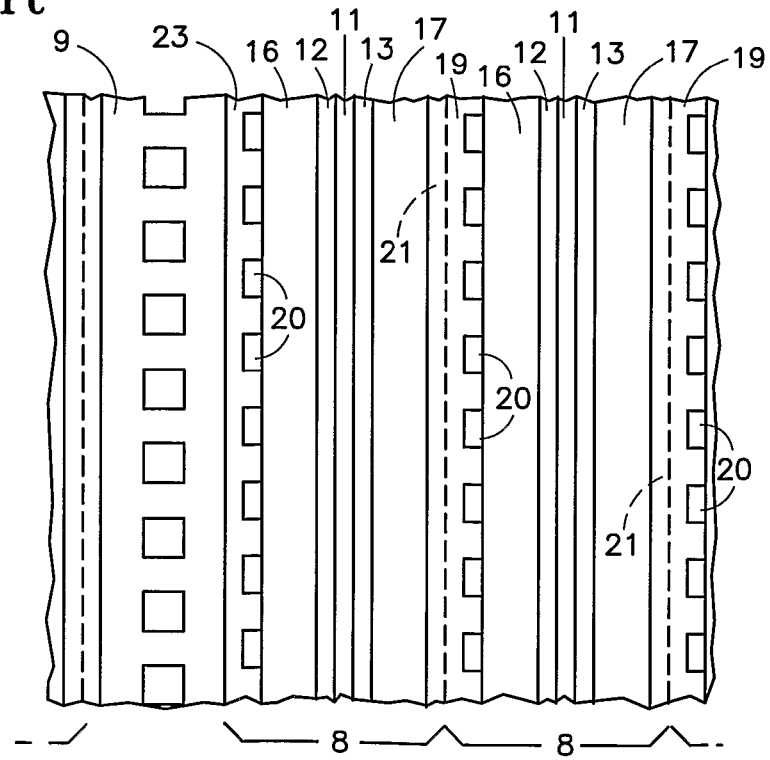
FIG. 2 is a fragmentary, simplified side elevation view of a pair of fuel cells and a cooler plate in a phosphoric acid fuel cell stack known to the prior art, not to scale, with sectioning lines omitted for clarity.
Figure 3:
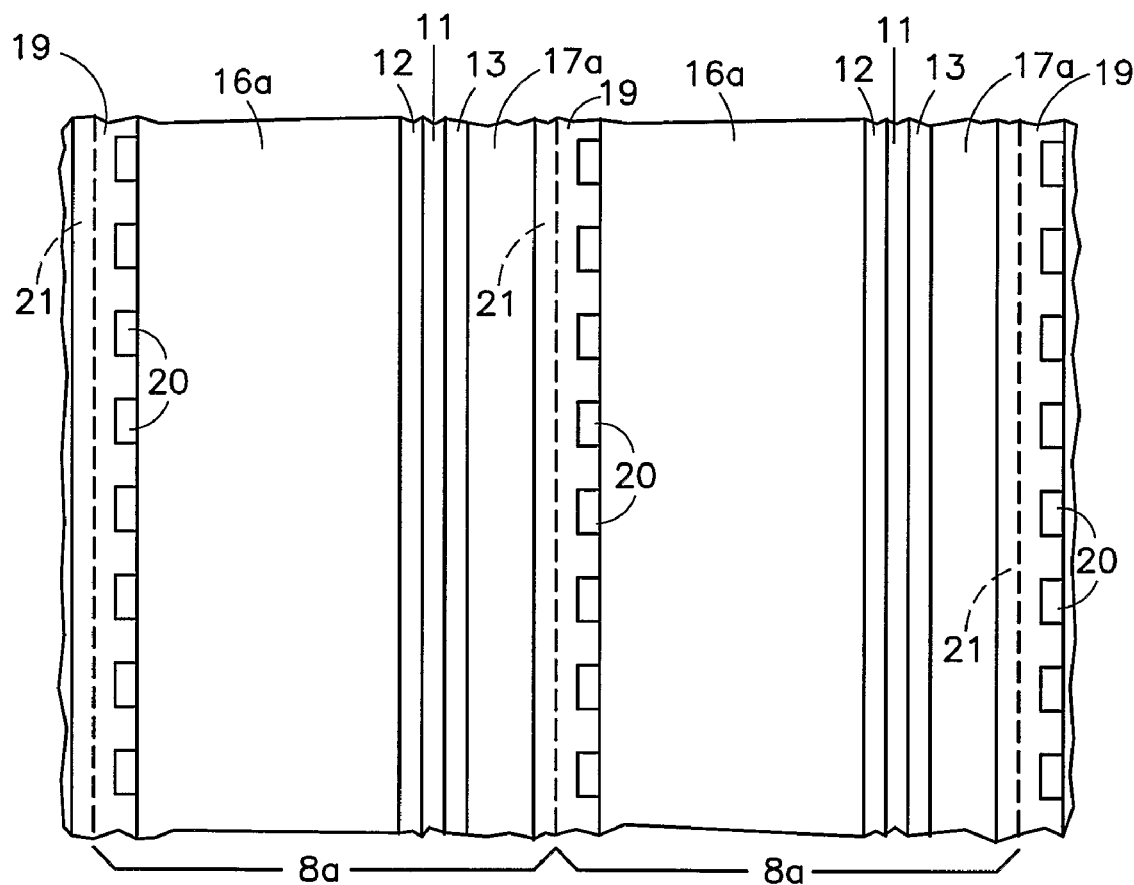
FIG. 3 is a fragmentary, simplified side elevation view of a pair of fuel cells and a cooler plate in a phosphoric acid fuel cell stack, not to scale, with sectioning lines omitted for clarity.

Referring to FIG. 3, a phosphoric acid fuel cell 8a is configured to employ a proton conducting liquid electrolyte, such as: phosphoric acid; or a mixture of phosphoric acid with either a fluorinated compound or siloxanes; or a liquid in which the anion is a fluoroborate or a fluoroheteroborate. The fuel cell 8a comprises a substrate 16a (GDL) adjacent to the anode catalyst 12 which is between about 1.75 and about 3 times as thick as the substrate 17a adjacent to the cathode catalyst 13. Although FIG. 3 is not to scale, the depiction of the anode substrate is substantially three times larger than the depiction of the cathode substrate. The separator plate assembly 19 is preferably configured in a manner similar to that disclosed in WO2006/071232, which is incorporated hereby by reference.

Figure 4:
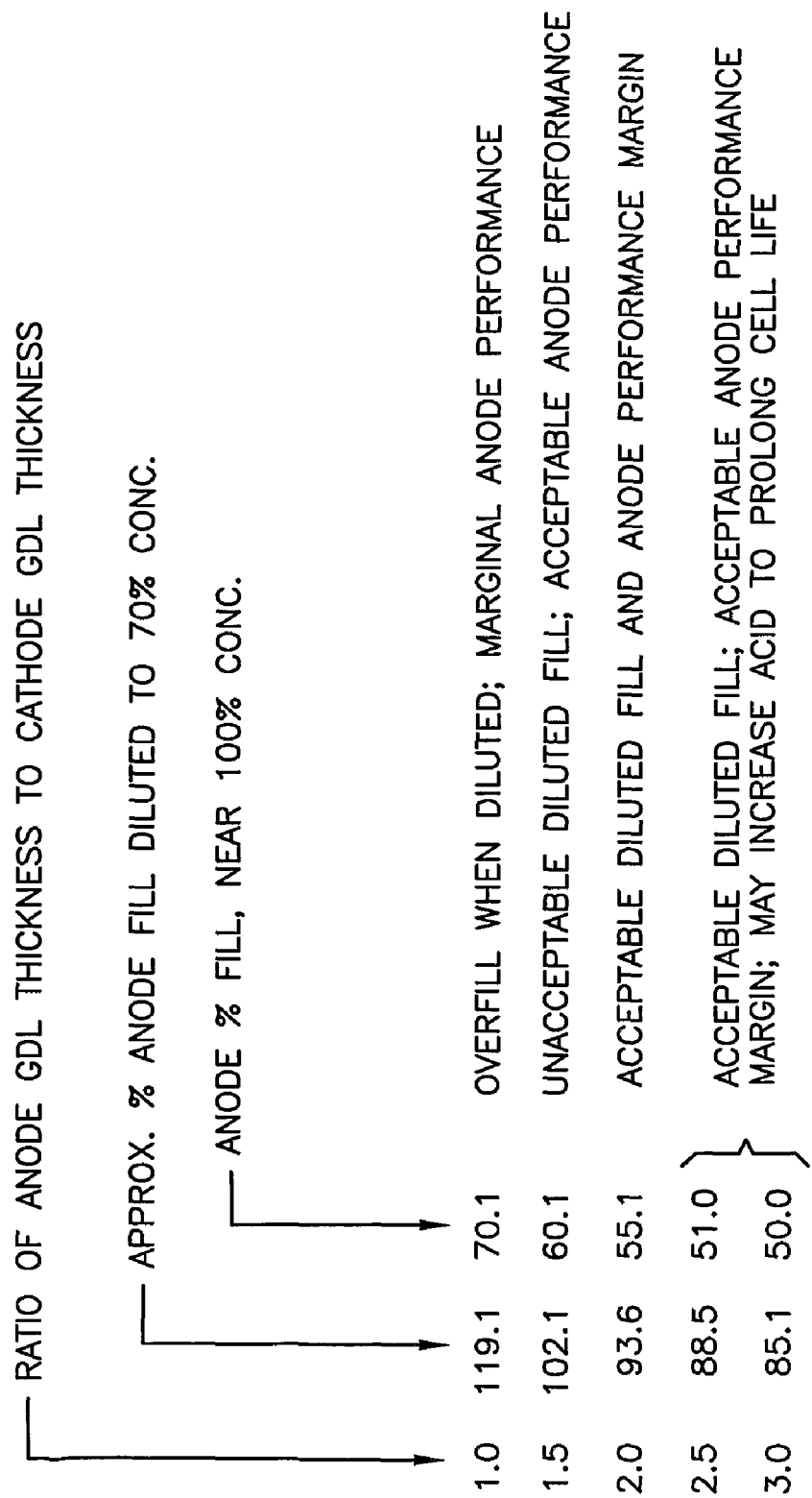
FIG. 4 is a table illustrating exemplary estimated features of phosphoric acid substrates.

FIG. 4 illustrates acid fill as a percent of void volume when the fuel cell is conditioned by dilution to 70 wt % concentration and at substantially 100 wt % concentration, as is the case when operating, for various ratios of anode GDL thickness to cathode GDL thickness. The table of FIG. 4 illustrates that even at a thickness ratio of only 1.5 to 1.0, the diluted fill may still be unacceptably high because it exceeds the void volume of the substrate. The concept herein, however, provides some benefit even if the ratio is near one; that is, providing an anode GDL that is measurably thicker than the cathode GDL will provide some advantage, and be better than a thickness ratio of 1.0 to 1.0. But at ratios of anode GDL thickness to cathode GDL thickness around 2.0 and above, the diluted fill is acceptable because it is less than the void volume of the substrate, and anode performance exceeds necessary performance by an acceptable margin. For even higher values, e.g., 2.5 to 1.0 and 3.0 to 1.0, the diluted fill level is very acceptable and the anode performance has a sufficient margin that additional acid may be added to the cell to prolong its life.

Thus, without increasing the overall thickness of each cell due to the electrode substrate thicknesses in each cell, the diluted electrolyte fill as a percent of porous substrate void and the margin of improved anode performance can both be made very acceptable.

From the data in FIG. 4, it can be perceived that benefits are obtainable with ratios of anode substrate thickness to cathode substrate thickness between 1.75 to 1.0 and 3.0 to 1.0.

The invention claimed is:

1. A liquid electrolyte fuel cell apparatus in which oxidant (21) and fuel reactant flow field channels (20) are provided in non-porous, hydrophobic separator plate assemblies (19) disposed to demarcate individual fuel cells (8), in which each fuel cell comprises:
    an electrolyte matrix (11) configured to hold a liquid electrolyte;
    an anode including an anode catalyst (12) disposed on one surface of said matrix and a porous anode substrate (16) disposed adjacent said anode catalyst, and
    a cathode including a cathode catalyst (13) disposed on a second surface of said matrix opposite to said one surface and a porous cathode substrate (17) disposed adjacent said cathode catalyst;
    characterized by:
    the thickness of said anode substrate portion of said anode, exclusive of said anode catalyst, being measurably thicker than the thickness of said cathode substrate portion of said cathode, exclusive of said cathode catalyst.

2. A fuel cell apparatus according to claim 1 further characterized by:
    the thickness of said anode substrate being at least two times the thickness of said cathode substrate.

3. A fuel cell apparatus according to claim 1 further characterized by:
    said anode substrate being thicker than said cathode substrate by a ratio of between 1.75 to 1.0 and 3.0 to 1.0.

4. A fuel cell apparatus according to claim 3 further characterized by:
said ratio being greater than 2.0 to 1.0.

5. A fuel cell apparatus according to claim 1 configured to use phosphoric acid as the electrolyte.

6. A phosphoric acid fuel cell apparatus in which oxidant (21) and fuel reactant flow field channels (20) are provided in non-porous, hydrophobic separator plate assemblies (19) disposed to demarcate individual fuel cells (8), in which each fuel cell comprises:
an electrolyte matrix (11) for holding phosphoric acid;
an anode including an anode catalyst (12) disposed on one surface of said matrix and a porous anode substrate (16) disposed adjacent said anode catalyst; and
a cathode including a cathode catalyst (13) disposed on a second surface of said matrix opposite to said one surface and a porous cathode substrate (17) disposed adjacent said cathode catalyst;
characterized by:
the thickness of said anode substrate portion of said anode, exclusive of said anode catalyst, being at least 1.75 times the thickness of said cathode substrate portion of said cathode, exclusive of said cathode catalyst.

7. A fuel cell apparatus according to claim 6 further characterized by:
the thickness of said anode substrate being at least two times the thickness of said cathode substrate.

8. A fuel cell apparatus according to claim 6 further characterized by:
said anode substrate being thicker than said cathode substrate by a ratio of between 1.75 to 1.0 and 3.0 to 1.0.

9. A fuel cell apparatus according to claim 8 further characterized by:
said ratio being greater than 2.0 to 1.0.

* * * * *